United States Patent [19]
Hulicsko

[11] Patent Number: 5,351,635
[45] Date of Patent: Oct. 4, 1994

[54] AGRICULTURAL SEEDER

[76] Inventor: Leslie Hulicsko, P.O. Box 3344, Regina, Saskatchewan, Canada, S4P 3H1

[21] Appl. No.: 922,327

[22] Filed: Jul. 30, 1992

[51] Int. Cl.$^5$ ............................................. A01C 5/06
[52] U.S. Cl. ..................... 111/135; 111/139; 172/705; 172/763; 172/643; 137/595
[58] Field of Search .................. 111/135, 139, 73, 7.3, 111/74; 172/684.5, 705, 710, 734, 763, 643; 137/595

[56] References Cited

U.S. PATENT DOCUMENTS

| | | | |
|---|---|---|---|
| 1,228,738 | 6/1917 | Barbarou | 137/595 |
| 2,357,730 | 9/1944 | Peacock . | |
| 2,742,192 | 4/1956 | Ward | 111/73 X |
| 4,311,104 | 1/1982 | Steilen . | |
| 4,384,537 | 5/1983 | duBruca | 111/73 X |
| 4,417,530 | 11/1983 | Kopecky . | |
| 4,603,645 | 8/1986 | Weimeyer | 111/73 X |
| 4,624,196 | 11/1986 | Anderson | 111/73 X |
| 4,721,047 | 1/1988 | Stauch | 111/73 |
| 4,762,075 | 8/1988 | Halford . | |
| 4,770,112 | 9/1988 | Neumeyer | 111/73 |
| 5,161,472 | 11/1992 | Handy | 111/73 |

FOREIGN PATENT DOCUMENTS

| | | | |
|---|---|---|---|
| 1942967 | 5/1970 | Fed. Rep. of Germany | 111/139 |
| 2075811 | 11/1981 | United Kingdom | 111/139 |

OTHER PUBLICATIONS

Brochure of Hiniker Company, Mankato, Minn. 56001 entitled "Hiniker 6150 Sweep Seeder".

Primary Examiner—Randolph A. Reese
Assistant Examiner—Christopher J. Novosad
Attorney, Agent, or Firm—Adrian D. Battison; Stanley G. Abe; Murray E. Thrift

[57] ABSTRACT

A seeding system includes a frame mounted on ground wheels for moving across the ground together with a plurality of individually mounted seeding elements carried on parallelogram linkages from the frame. A seeding element includes a walking beam arrangement having a single front wheel and a pair of rear wheels straddling the seeding sweep positioned between the front and rear wheels. The rear wheels act as packer wheels for two rows of seeds. The walking beam system lifts a main support frame of the seeding element against the bias from a pressurized controlled hydraulic cylinder. The seeding sweep is mounted upon a trip shank. The seeds are supplied through a tube which splits at the sweep to deposit the seeds into the cavity within the sweep on either side of the center line of the sweep. A fertilizer banding knife projects downwardly and rearwardly from the lower end of the shank to a position rearwardly of the sweep. A trash cleaning system comprises a transverse shaft driving a plurality of tines which are rotatable about the axis of the shaft on either side of the seeding system to knock away trash collected in front of the shank.

17 Claims, 9 Drawing Sheets

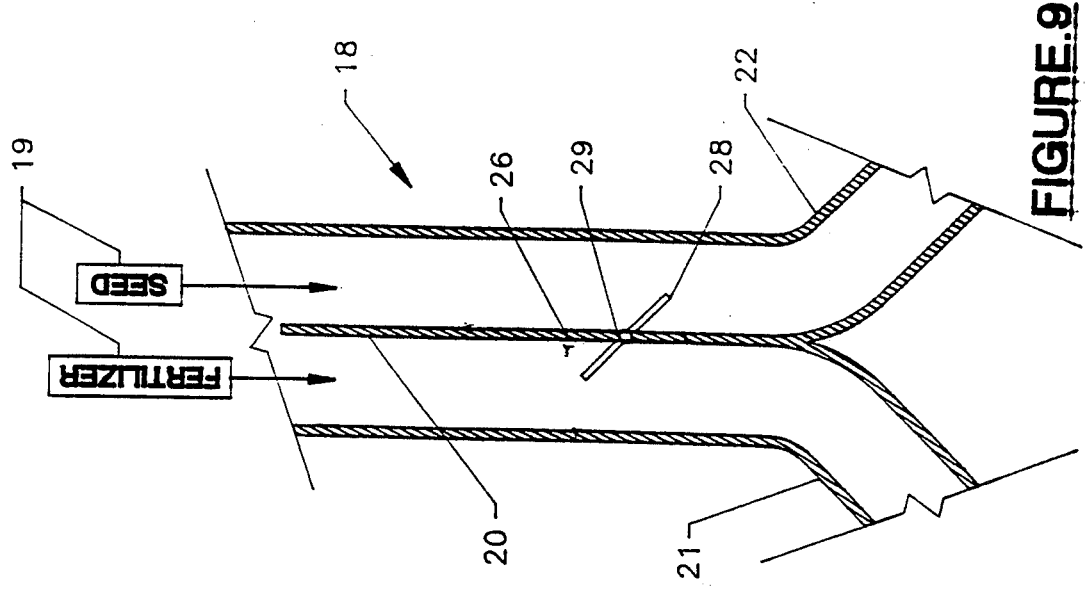
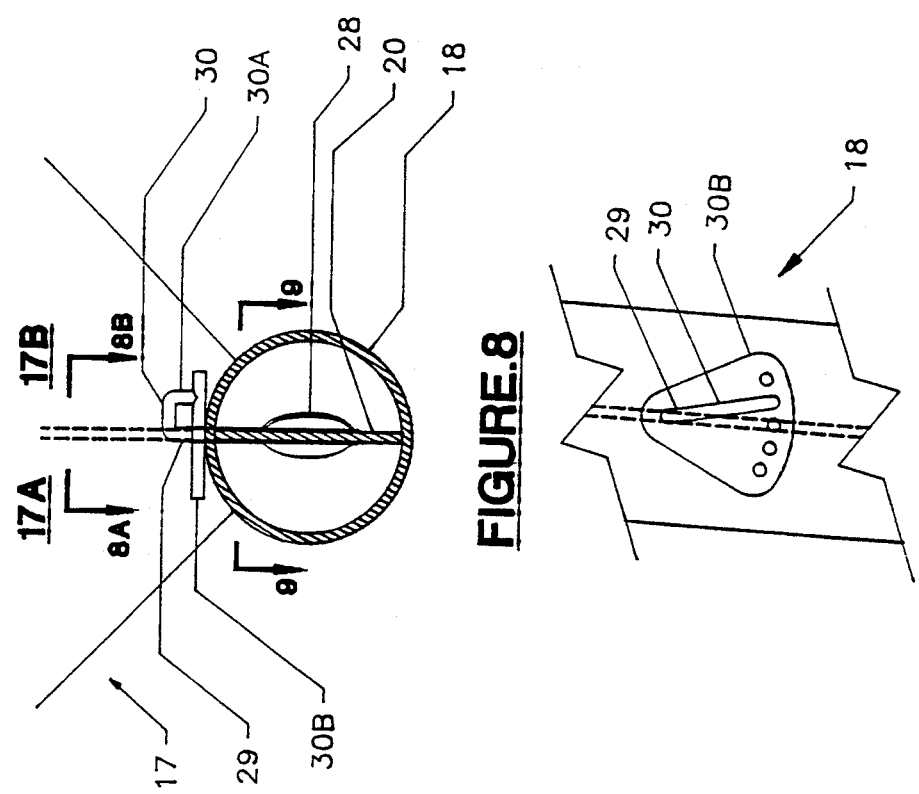

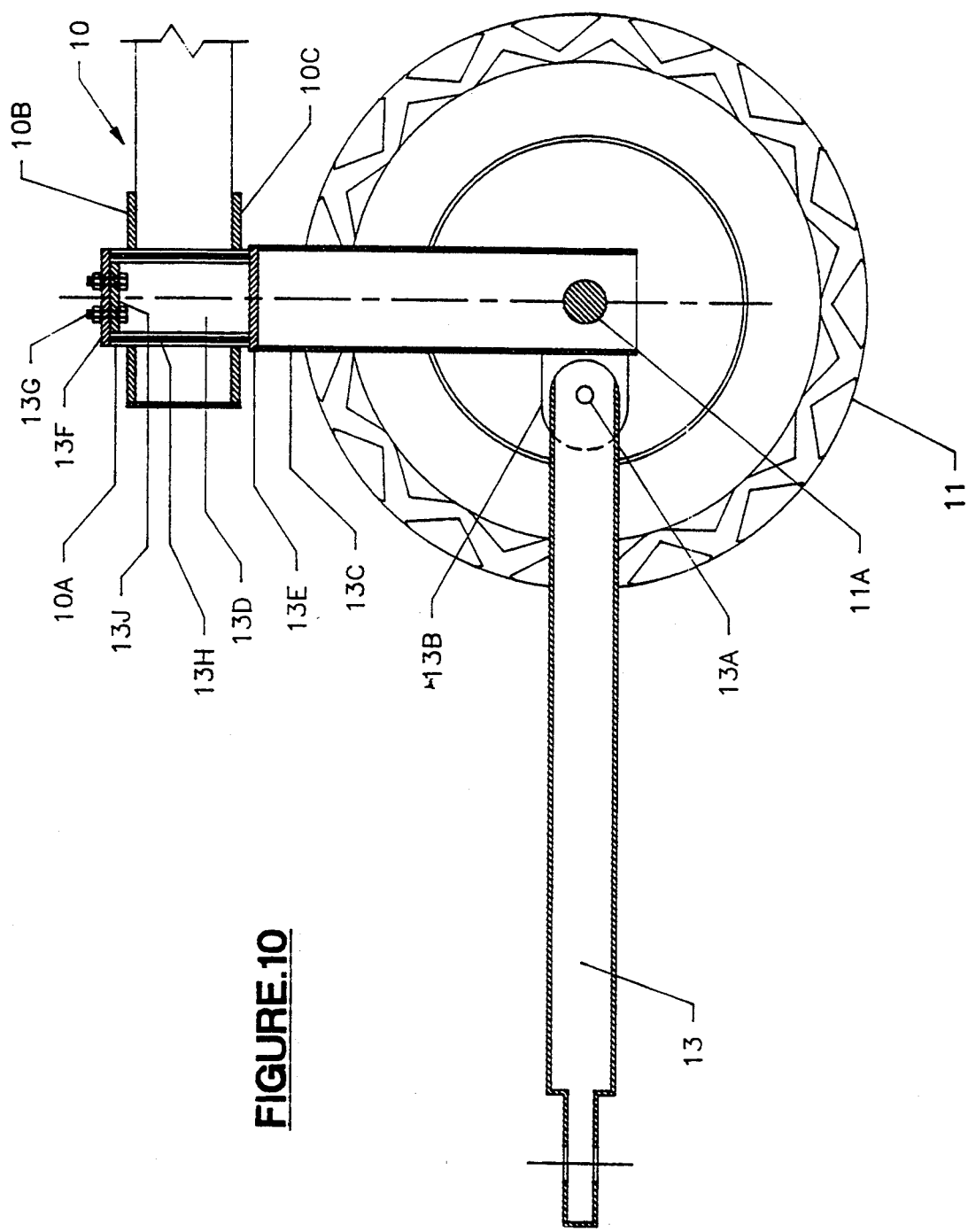

AGRICULTURAL SEEDER

This invention relates to agricultural seeder of the type generally known as an air seeder in which seeds are conveyed from a central hopper to a number of seeding elements carried upon a frame with the seeds being ejected into the ground through ground cutting means provided on each of the seeding elements.

BACKGROUND OF THE INVENTION

Air seeders of this type have generally used either a knife or a cutting sweep which is carried at each of the seeding elements by the frame so as to cut a furrow in the ground into which the seeds are deposited. The depth of seeding is of fundamental importance to the germination and must therefore be very accurately controlled. The seed must be properly placed a required spacing from the soil surface and also taking into account soil surface moisture characteristics and the sub-surface moisture to obtain the optimum germination.

At the same time as the seeding process, it is highly desirable to effect banding of a fertilizer material so that the fertilizer is located adjacent to but spaced from the seeds so that once germination has occurred the roots can access the fertilizer. It is common therefore to provide a second duct on the seeding element for transportation of fertilizer to a position adjacent to but spaced from the seeds. It is undesirable to place the fertilizer directly with the seeds due to the chemical burning effect which can be obtained.

In many air seeders the depth of seeding is controlled by mounting the seeding element in fixed position on the frame and then by controlling the height of the frame relative to the ground as accurately as possible by providing a frame which can flex at different positions so the height of the frame varies to follow as accurately as possible the contours of the ground. However this approach has of course its limitations in that the frame necessarily must have some structural stability which thus limits its ability to totally follow the contours of the ground. Thus some of the seeding elements will at various times provide a depth of seeding which is too deep and other times the depth will be too shallow.

Attempts have been made to develop seeding systems in which the seeding elements are individually mounted upon the frame so that they can individually follow the contours of the ground.

One example of an arrangement of this type is shown in U.S. Pat. No. 4,417,530 (Kopecky) which shows a seeding element mounted upon a fixed tool bar with the seeding element being free to move up and down, the depth of the seeding being controlled by engagement of the packer wheel with the ground behind the seeding action.

Another example of an arrangement of this type is shown in U.S. Pat. No. 4,311,104 (Steilen) which shows a parallelogram linkage arrangement in which again the depth of seeding is controlled by the rolling action of a trailing packer wheel.

An older U.S. Pat. No. 2,357,730 (Peacock) discloses a similar arrangement in which fertilizer is deposited into a centre part of a furrow and seeds are deposited in two rows on either side of the centre part of the furrow through a second seeding element. Again the depth of the seeding action is controlled by a packer wheel.

In more recent years Halford in his U.S. Pat. No. 4,762,075 has provided an arrangement of this general type which is designed particularly for use in a "no-till" farming system in that the cutting action is effected by a narrow knife thus avoiding disturbing soil on either side of the seeding and fertilizing action.

In addition in a recent development Hiniker has disclosed in their brochure for their machine known as "6150 Sweep Feeder" an arrangement similar to the patent of Peacock in which there is a forward cutting knife depositing fertilizer and the subsequent double row feeding shank which deposits two row of seeds behind the fertilizer knife. Hiniker have provided two parallel packer wheels in place of the single wide packer wheel of Peacock. Hiniker have also provided a coulter which is positioned just in front of the fertilizer knife and is stated to be an independent depth gauge coulter which cuts through residue and maintains precise seed placement depth. It is understood therefore that the coulter provides an independent initial cutting action on the soil so as to avoid the remaining crop residue in a "no till" operation from interfering with the proper depth control provided by the conventional arrangement of the packer wheel and cutting knife assembly.

It is believed that the above examples are all heading in the right direction in providing a seeding action which can be effected in relatively heavy crop residue necessary in a no till operation while providing better control over the depth of the seeding action. However there remains opportunity for significant improvements in this field.

SUMMARY OF THE INVENTION

It is one object of the present invention, therefore, to provide an improved seeding apparatus which further and more accurately controls the seeding depth.

It is a further object of the present invention to provide a seeding apparatus in which the collection or accumulation of crop residue is avoided.

It is a further object of the present invention to provide a design of seeding element for a seeder in which the seeding sweep is properly protected by a trip mechanism and yet is accurately controlled at a required depth.

It is yet a further object of the present invention to provide a seeding apparatus for more effectively applying the seeds and fertilizer to the ground.

According to the invention, therefore, there is provided an agricultural seeder comprising a frame, means for supporting the frame for transportation in a direction of working movement across ground to be seeded, a plurality of seeder elements mounted on the frame at spaced positions across the width of the frame for applying seeds to the ground as the frame is moved across the ground, supply means for supplying seeds to each seeder element, each seeder element including ground cutting means for cutting a furrow into the surface of the ground, seed feeding means for depositing seeds from the supply means onto the ground within the furrow, mounting means mounting the ground cutting means of each seeder element for movement relative to the frame independently of the other seeder elements in a direction to vary the height of the cutting means relative to the frame, and height control means for controlling the height of the cutting means relative to the ground such that the cutting means moves relative to the frame to be maintained at a required height relative to the ground surface, said height control means comprising a first grounding engaging rolling element positioned forwardly of the cutting means, a second ground engaging rolling element positioned rearwardly of the cutting means, interconnecting strut means rigidly interconnecting the first and second rolling elements and pivot mounting means connecting the strut means to the ground cutting means to allow pivotal movement of the strut means and the first and second rolling elements relative to the cutting means about an axis transverse to the direction of movement such that vertical movement of either of the first and second rolling elements is communicated to the cutting means.

One embodiment of the invention will now be described in conjunction with the accompanying drawings in which:

BRIEF DESCRIPTION OF THE DRAWINGS

FIG. 5A is cross-sectional view along the lines 5A—5A of FIG. 5.

FIG. 8 is a cross sectional view along the lines 8—8 of FIG. 7 on an enlarged scale.

FIG. 8A is a top plan view of the control lever of FIG. 8.

FIG. 9 is a view along the lines 9—9 of FIG. 8.

FIG. 10 is a cross-sectional view along the lines 10—10 of FIG. 7 on an enlarged scale.

In the drawings like characters of reference indicate corresponding parts in the different figures.

DETAILED DESCRIPTION

Figure 7:
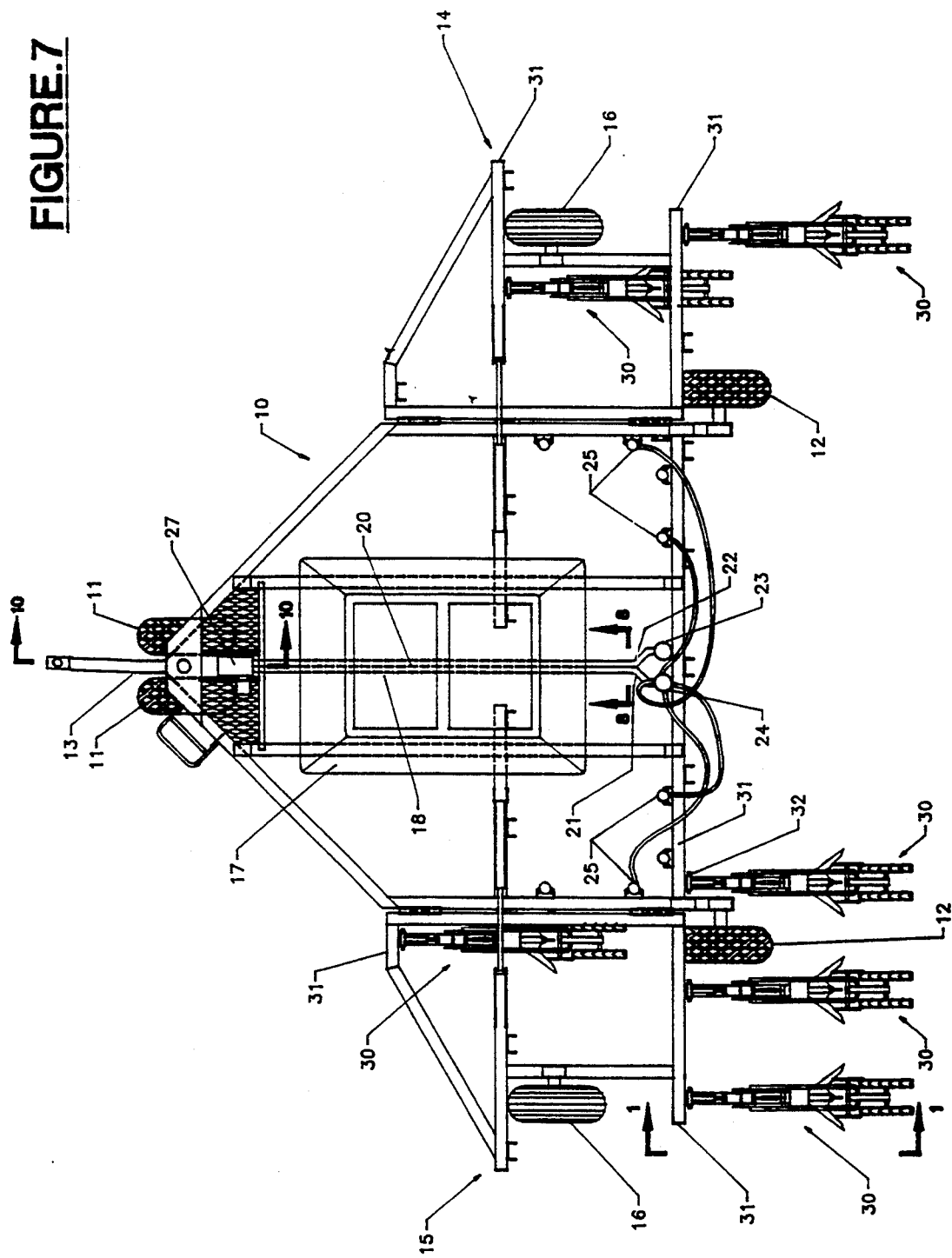
FIG. 7 is a top plan view of the seeding apparatus including the feeding element of FIG. 1, only some of the seeding elements being shown, the remainder being omitted for convenience of illustration.

Turning firstly to FIG. 7 the whole of the seeding apparatus is shown in plan and comprises a main central frame 10 mounted for movement across ground to be seeded on a front wheel assembly including a pair of ground wheels 11 and a rear pair of spaced ground wheels 12. The frame is generally rectangular and formed from longitudinal and transverse beams in conventional manner. A forward part of the frame includes a hitch 13 for coupling to a towing vehicle. The front wheels 11 (see FIG. 10) are mounted close together on an axle 11A. The axle 11A passes through a square post 13C which stands vertically upwardly therefrom. Each wheel 11 is carried on a respective end of the axle 11A on either side of the post. On the front of the post is mounted a pair of spaced lugs 13B which couple a rear end of the hitch pole 13 to the post by a transverse pivot pin 13A passing through the hitch pole and through the lugs 13B. This allows the hitch pole to pivot in a vertical plane relative to the post 13C.

At a forward end of the main frame 10 is provided a vertical tube 10A which is welded to and passes through a top plate 10B and a bottom plate 10C attached to the top and bottom respectively of the main frame 10. The tube 10A receives a vertical tube 13D welded to the top of the post 13C via a horizontal plate 13E. Rotational movement between the inner tube 13D and the support tube 10A is provided by a bushing 13H. Across the top of the inner tube 13D is welded a top plate 13J. The plate 13J is bolted to a cap plate 13F by bolts 13G. The cap plate 13G thus abuts the top of the support tube 10A and the bushing 13H to act as a top thrust bearing. The horizontal plate 13E abuts the opposed end of the tube and the bushing and thus forms the opposed thrust bearing thus allowing rotation of the post 13C about a vertical axis to cause steering movements of the front wheels 11 under force from the hitch pole 13.

The details of the frame structure are not described as these will be apparent to one skilled in the art and do not form an important part of this invention.

The ground wheels 11 and 12 are generally fixed in height relative to the frame since the frame maintains a constant height relative to the ground and does not need to be raised and lowered as the seeding elements themselves are individually raised and lowered as described hereinafter. This allows the hopper to be carried directly on the frame, rather than as a separate trailer as is necessary with conventional air seeders, since the weight of the hopper which varies with its level of fill does not affect the weight applied to the seeding elements.

The frame further includes two wing frame sections 14 and 15 each of which is connected to the mainframe section by a hinge connection parallel to the direction of movement allowing the wing frame section to be folded upwardly in a transport position (not shown). The wing frame sections include ground wheels 16 for carrying the wing frame section across the ground.

The frame carries a hopper 17 which is divided into two sections 17A and 17B (FIG. 8) for transporting seeds in one part of the hopper and fertilizer in the second part of the hopper for application to the ground through the seeding elements. At the bottom of the hopper is provided a cylindrical transportation duct 18 into which the materials from the hopper sections 17a and 17b fall by way of a metering arrangement schematically indicated at 19. The cylindrical duct 18 is divided into two separate semi-circular duct portions by a central dividing wall 20 so that the seeds are metered into one duct portion on one side of the central wall 20 and the fertilizer is metered into the second duct portion on the opposite side of the dividing wall 20. At the end of the duct, the duct splits into two separate duct portions 21 and 22 leading respectively to distribution towers 24 and 23 of the type conventionally used on an air seeder.

As shown in FIG. 7 the distribution tower 24 splits into four separate distribution ducts with the material from the duct portion 21 being equally divided amongst the four ducts which are then transported to four separate further distribution towers 25 in conventional manner. For convenience of illustration the full plumbing layout of the machine is not shown but the person skilled in the art will appreciate that the ducts and distribution towers are used to meter the materials for supply to the individual seeding elements.

The fertilizer and seeds are carried through the ducts for the distribution and splitting action by an air stream generated by a fan 27 carried on the frame at a suitable location.

The central dividing wall 20 has an opening 26 at a position downstream of the metering units 19. The opening 26 can be closed by a flap valve 28 which pivots about a vertical pivot pin 29 having a handle 30 at the upper end exposed on upper surface of the duct 18. By the operation of the handle, therefore, the flap valve can be moved from a fully closed position in which the dividing wall 20 is complete and fully separates the seeds and fertilizer material to various degrees of an open position in which a part of the flap valve 28 projects into the fertilizer duct portion to extract part of the stream of air and fertilizer flowing in that duct portion. It will be appreciated at the amount of fertilizer extracted will vary in dependence upon the angle of the flap valve 28. The handle 30 includes a vertically downwardly extending pin 30A which engages into a selected one of a plurality of holes in a plate 30B to set the required adjustment of the flap valve 28.

By using this simple technique, a portion of the fertilizer can be extracted from the fertilizer duct and mixed with the seeds, the mixing action being relatively intimate in view of the distribution towers. In this way, as explained hereinafter, the seeds can be applied to the ground in conjunction with a small proportion of the fertilizer with the remaining proportion of the fertilizer being applied burning the seeds while allowing access of the roots from the seeds to the fertilizer.

In FIG. 7 six of the seeding elements are illustrated and indicated at 30. These seeding elements trail behind a transverse frame element 31 and arranged alternatively on forward and rearward frame elements in conventional manner so as to provide a seeding action across the full width of the frame while allowing sufficient space in between the individual seeding elements on each of the transverse frame members. The remaining seeding elements are omitted from the frame structure in FIG. 7 for convenience of illustration.

One of the seeding elements is illustrated in detail in FIGS. 1 through 6. The remaining seeding elements are identical to the one illustrated in FIGS. 1 through 6.

On a rear vertical face of the frame beam 31 is mounted a vertical channel member 32 with an open face of the channel member 32 facing rearwardly and defining two side flanges in parallel transversely spaced arrangement.

The seeding element further includes a mainframe member 33 formed of a vertical channel member 34 and a horizontal channel member 35 which are connected at right angles with the channel member 35 at the base of the channel member 34. The channel members are arranged with the open face of the channel member 34 projecting forwardly toward the channel member 32 and the open face of the channel member 35 projecting downwardly.

Between the channel member 34 and the channel 32 is provided a parallelogram linkage 36 including a lever 37 and a second lever 38 which are of course parallel and each comprises a tubular member which is connected at a first end to the channel member 32 by transverse pins 39 and at its opposed end to the channel member 34 by transverse pins 40.

This parallelogram linkage allows the main support frame of the seeding element to move vertically, upwardly and downwardly in dependence upon the ground position as described hereinafter. The parallel movement keeps the main frame member 33 and therefore the seeding system at a constant angle to the ground as the height varies.

In addition between the channel member 32 and a pair of lugs 41 on the top face of the tubular lever 38 is provided a hydraulic cylinder assembly 42. The assembly 42 includes a cylinder 43 and a piston rod 44. The cylinder 43 includes a coupling sleeve 45 at its outer end carried on a transverse pin 46 at the top of the channel member 32. The piston rod 44 includes a connecting sleeve 47 similarly connected to a transverse pin 48 between the spaced lugs 41 on the top of the tubular lever 38. The cylinder is thus positioned so that an expansion stroke of the cylinder will cause force on the main support frame vertically downwardly to apply downward pressure to the seeding element and a retraction stroke of the cylinder will cause a lifting action of the seeding element for movement to a retracted or transport position raised from the ground.

The cylinder 43 includes supply ports 49 and 50 for the expansion and retraction strokes with hydraulic fluid being supplied from a central control unit 51 which is common to all of the cylinders of the individual seeding elements.

A control unit 51 is arranged in use to supply to the port 49 during operation of the seeding element hydraulic fluid at a constant supply pressure thus providing a constant downward force on the seeding elements. However, the control unit 51 will also allow the cylinder to float in that the fluid is supplied under a constant pressure but can be supplied to and received from the cylinder in response to upward and downward movement of the seeding element caused by changes in ground height relative to the frame. This provides therefore a controlled floating action with a constant biasing force. The amount of force can be varied by actuating a simple central control arm (not shown) on the control unit to vary the hydraulic pressure.

In order to maintain the stability of the main support frame against side to side twisting movement, the levers 37 and 38 are formed from 4 inch to 2 inch flat tubing.

The height of the main support frame 33 relative to the ground is controlled by a walking beam arrangement 52 including a front rolling element or wheel 53 rotatable about a transverse axle 54 and a pair of rear rotatable elements or packer wheels 55 each of which is rotatable about a common transverse axle 56. Each of the wheels 53 and 55 comprises a semi-pneumatic tire portion 57 mounted upon a conventional rim and support disc 58 the details of which are not shown as it will be well known to one skilled in the art. The semi-pneumatic tire 57 is of the type which has a hollow interior but is not inflatable, and this defines a relatively wide band in contact with the ground which allows some flexibility and rolls over the ground surface without any cutting action. The wheels are of the type commonly used as a packer wheel and the rear wheels 55 act as packer wheels as described hereinafter.

Figure 1:
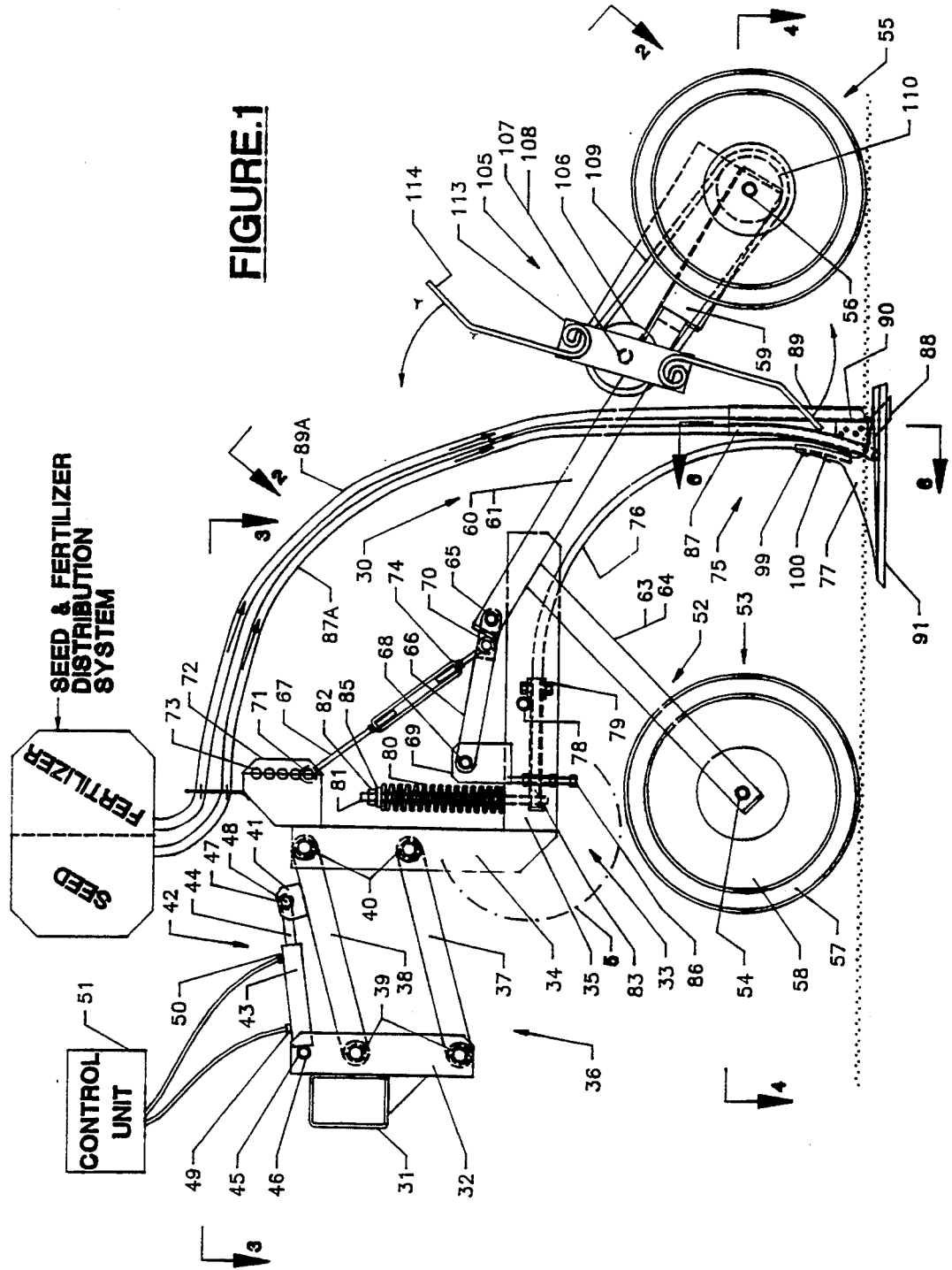
FIG. 1 is a side elevational view of one seeding element of a seeding apparatus.
Figure 4:
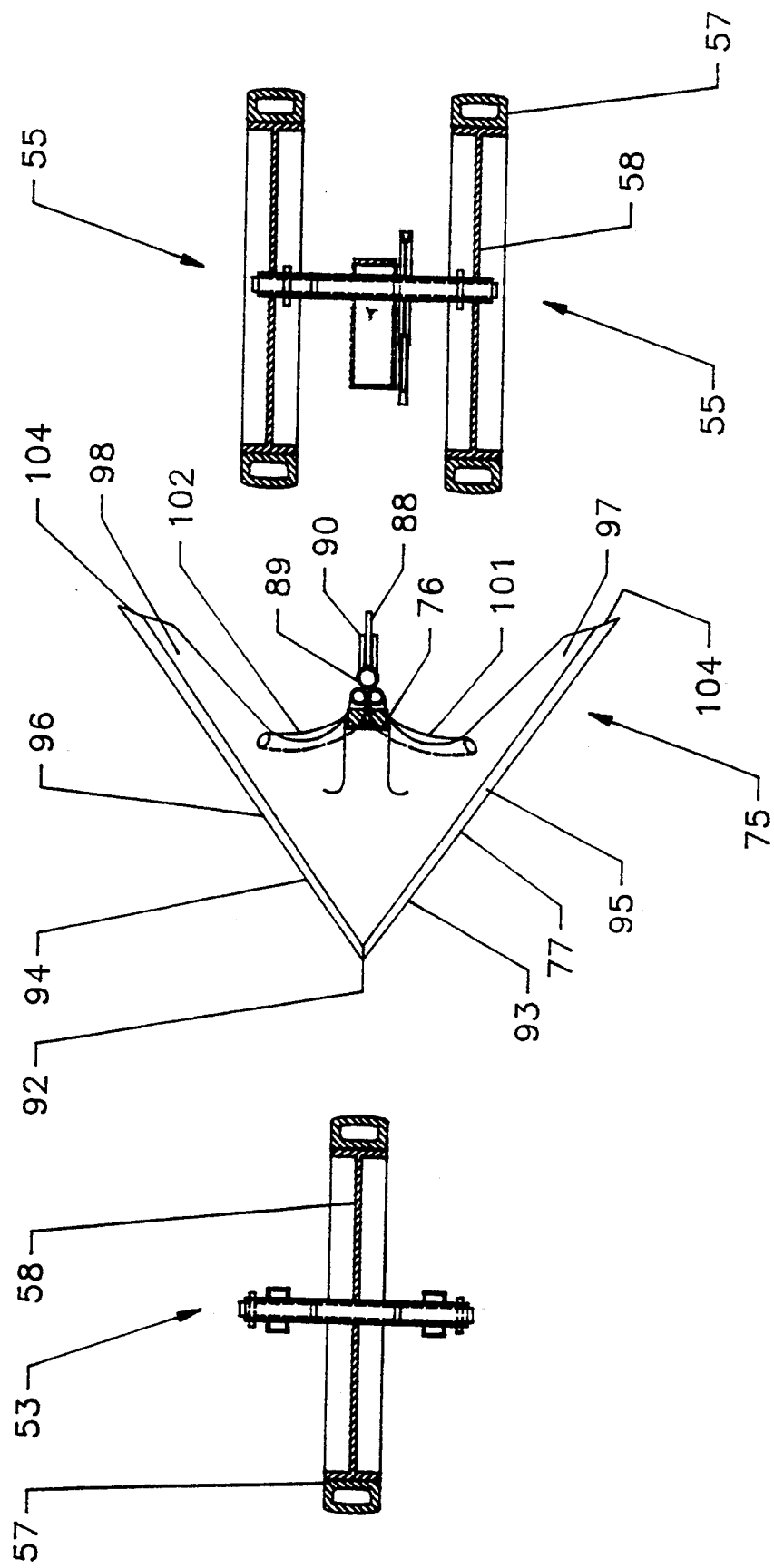
FIG. 4 is a cross sectional view taken along the lines 4—4 of FIG. 1.

The shaft 56 is mounted for rotation on a strut 59 positioned between the wheels and extending therefrom upwardly and forwardly. The strut 59 is welded to a yolk 60 including a pair of side struts 61 and 62 which form a loop having a rear end welded to the sides of the strut 59 and a forward end straddling a rear part of the channel member 35. The shaft 54 is carried by a pair of forks 63 and 64 each welded to an underside of a respective one of the side struts 61 and 62 so that an upper end 63A, 64A is welded to the underside of the respective side strut at an angle thereto so as to extend downwardly and forwardly therefrom as shown in FIG. 1. The forks supporting the front wheel and the strut supporting the rear wheels thus form a common rigid structure for rolling on the ground in a tricycle type arrangement with the front wheel forwardly of the seeding system as described hereinafter and the rear wheels rearwardly thereof, the layout being best shown in FIG. 4 showing the front wheel positioned on a centre line between the two rear wheels.

The walking beam system 52 is attached to the main support frame 33 by an adjustment system generally indicated at 64. The connection and adjustment system 64 includes a main transverse pivot pin 65 attached to the upper most end of the side struts 61 and 62 and connected to the main support frame. The walking beam system is therefore pivotal about the transverse pin 65 so that the front wheel can lift independently relative to the rear wheels and vice versa and the position of the main support frame 33 is controlled in dependence upon a resulting position of the height of the transverse pin 65 which is therefore dependent upon the combination of the heights of the front and rear wheels.

The transverse pin 65 is connected to the main support frame by a lever 66 and by an adjustable strut 67. The lever 66 has a forward end pivoted on the pin 65 and the rearward end pivoted on a transverse pin 68 carried on a pair of lugs 69. The lugs 68 are welded to the top surface of the channel member 35 and are therefore fixed relative thereto. The position of the pin 65 relative to the channel member 35 can be adjusted by moving the adjustable lever 67. This acts therefore to adjust the height of the walking beam arrangement 52 relative to the main support frame and thus relative to the seeding system carried by the main support frame.

The lever 66 comprises a pair of side straps connected by sleeves 66A and 66B mounted on the respective pins 68 and 65.

The adjustable strut 67 is mounted at its lower end on a transverse pin 70 connected to the lever 66 at a position just spaced from the pin 65. The upper end of the adjustable strut 67 is connected to a pin 71 which includes a course adjustment system defined by parallel plates 72 including a plurality of openings 73 into which the pins 71 can be inserted as required. The length of the adjustable lever 67 can also be adjusted in a fine adjustment by a turn buckle arrangement generally indicated at 74.

The seeding system is generally indicated at 75 and includes a curved shank 76 extending downwardly from a shank holder 83 on the main support frame 33 to a sweep 77 mounted at the lower end of the shank 76. The upper end of the shank 76 is connected to the channel member 35 by the shank holder 83 which includes a bushing 83D welded to a top face of the shank holder and includes a transverse pin 78 passing through the depending side flanges of the channel member 35. The shank is mounted on the shank holder by a clamping plate 83F which is connected to a plate 83E welded to the top of the shank holder by clamping bolts. The shank 76 can thus pivot about the pin 78 within the channel member about the horizontal axis of the pin from an initial working position as shown in FIG. 1 to a trip position in which the sweep moves rearwardly and upwardly to clear an obstacle. The trip action is effected by the pivotal movement of the shank about the pin 78. This pivotal movement is resisted by a pair of springs 80 carried on an upper surface of the horizontal web of the channel member 35. Each spring surrounds a vertical leg 81 of a U-bolt which extends from a head 82 at the upper end of each leg downwardly through a hole in the web 35A of the channel member 35 to the U-shaped lower end of the U-bolt which is wrapped around the forward end of the shank holder 83, and held in place by the bottom edge of a front plate 83G. The simple engagement of the base of the U-bolt on the shank holder allows the required pivotal movement therebetween.

In FIG. 1 the shank is shown in its normal working position.

Figure 5:
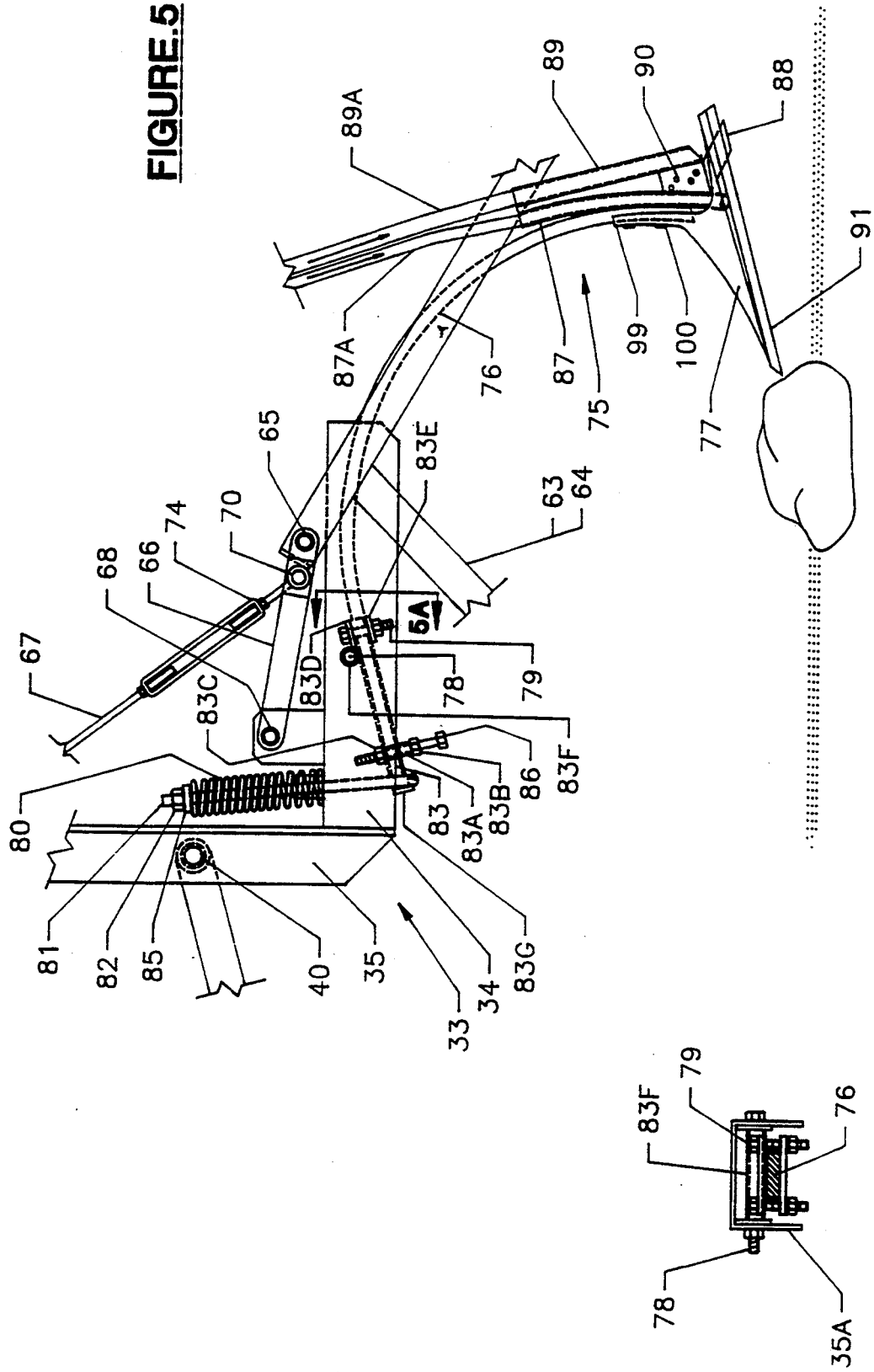
FIG. 5 is a cross sectional view taken along the lines 5—5 of FIG. 1.

In FIG. 1 the shank is shown in its normal working position. In FIG. 5 the shank is shown in the trip position in which the forward end of the shank is forced downwardly by the trip action of the impact of the obstacle with the sweep thus pulling the U-bolt 81 through the web 35A and compressing the springs 80.

A set screw 86 extends through a spacer sleeve 83A carried on the shank holder and passing through the conventionally provided hole in the shank to a position abutting the underside of the web 35A. The cooperation between the hole in the shank and the sleeve also acts to assist the securement of the shank or the shank holder. The spacer sleeve abuts a nut 83C welded to the top of the shank holder and the position of the set screw 86 relative to the nut 83C is locked by lock nut 83B. Thus in the normal working position shown in FIG. 1 the set screw 86 locates the position of the shank by preventing further upward movement of the shank in response to the spring pressure. This position can be adjusted simply by rotating the set screw in conventional manner thus slightly pivoting the shank about the pin 78. In the trip action the set screw simply moves away from the web until the trip is released and the shank moves back to the normal working position. The set screw is used to finely trim the angle of the sweep 77 to maintain the lower cutting edge in an exactly required plane identical to the plane of the sweeps of the other seeding elements thus taking into account manufacturing variations which could otherwise cause a twisting of the sweep thus reducing its effective action. In many cases the sweep will be set exactly horizontal. In other cases a slight downward incline may be used, depending upon soil conditions.

The seeding system includes the sweep 77 together with a seed supply duct 87 for applying the seeds to the ground within a furrow below the surface of the ground to a depth required and set by the adjustment of the seeding system.

Furthermore the seeding system includes a fertilizer banding device including a rearwardly and downwardly projecting banding knife 88 and a fertilizer supply tube 89 positioned rearwardly of the sweep so as to deposit fertilizer into the ground behind the action of the sweep. As shown in FIG. 4 the banding knife 88 comprises a simple vertical plate which is located along the center line of the sweep. The knife 88 is clamped between two plates 90 which are welded to the rear face of the seed supply duct 87 so as to extend rearwardly therefrom in spaced parallel relationship. The fertilizer supply tube 89 includes two parallel plates extending forwardly therefrom each arranged to lie against an outside surface of one of the plates 90 to form a sandwich locking the supply tube and the knife together and its depth can be adjusted by moving the knife within the clamping plates 90 connecting the banding knife to the shank so as to be carried thereby for movement therewith. In most cases, the banding action of the banding knife is arranged at a depth beneath that of the seeding action so as to form a band of the fertilizer between two rows of the seeds and at a depth greater than the seeds so that the seeds from each of the two rows can access the fertilizer by growing downwardly and inwardly toward the fertilizer band. However this location of the fertilizer can be adjusted by the adjustment of the knife 88. The tube 89 comprises a simple metal tube which extends from an upper open mouth connected to a supply duct 89A downwardly and rearwardly to a discharge mouth at an upper rear face of the knife 88. The duct 89A is supplied with fertilizer from the distribution system previously described and shown schematically in FIG. 7.

Figure 6:
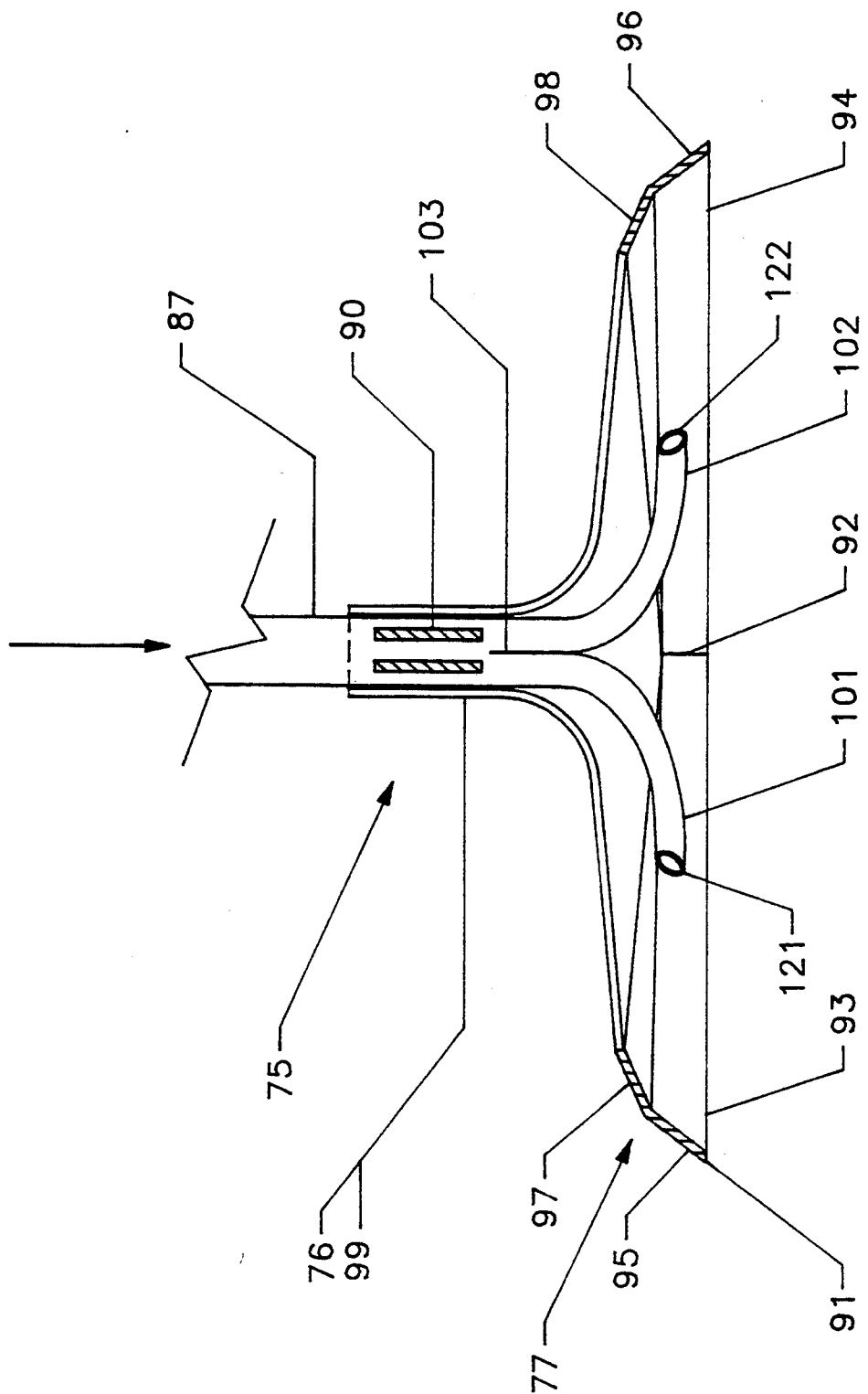
FIG. 6 is a cross sectional view taken along the lines 6—6 of FIG. 1.

The sweep 77 is shown in FIGS. 1, 4 and 6 and includes a lower most cutting edge 91 lying in a horizontal (or slightly downwardly inclined) plane as adjusted by the set screw 86. The horizontal cutting edge includes a forward most apex 92 and two diverging portions 93 and 94 which extend outwardly and rearwardly from the apex at an acute angle. The lower most cutting edge 91 thus forms a shelf in the soil by cutting along the line of the lower most edge and lifting the soil above that line away from the shelf for travel over the body of the sweep and back to the ground behind the sweep.

The sweep body further includes two inclined surfaces 95 and 96 which are inclined upwardly and inwardly from the respective cutting edge 93, 94. The sweep further includes a generally horizontal or slightly inclined surface portion 97, 98 on each side of the sweep and connected from an upper edge of the surface 95, 96 and extending inwardly therefrom. The surface portion 97, 98 is connected to an upwardly and rearwardly extending connecting flange 99 which extends along a front face of the shank 76 and is connected thereto by bolts 100.

Figure 2:
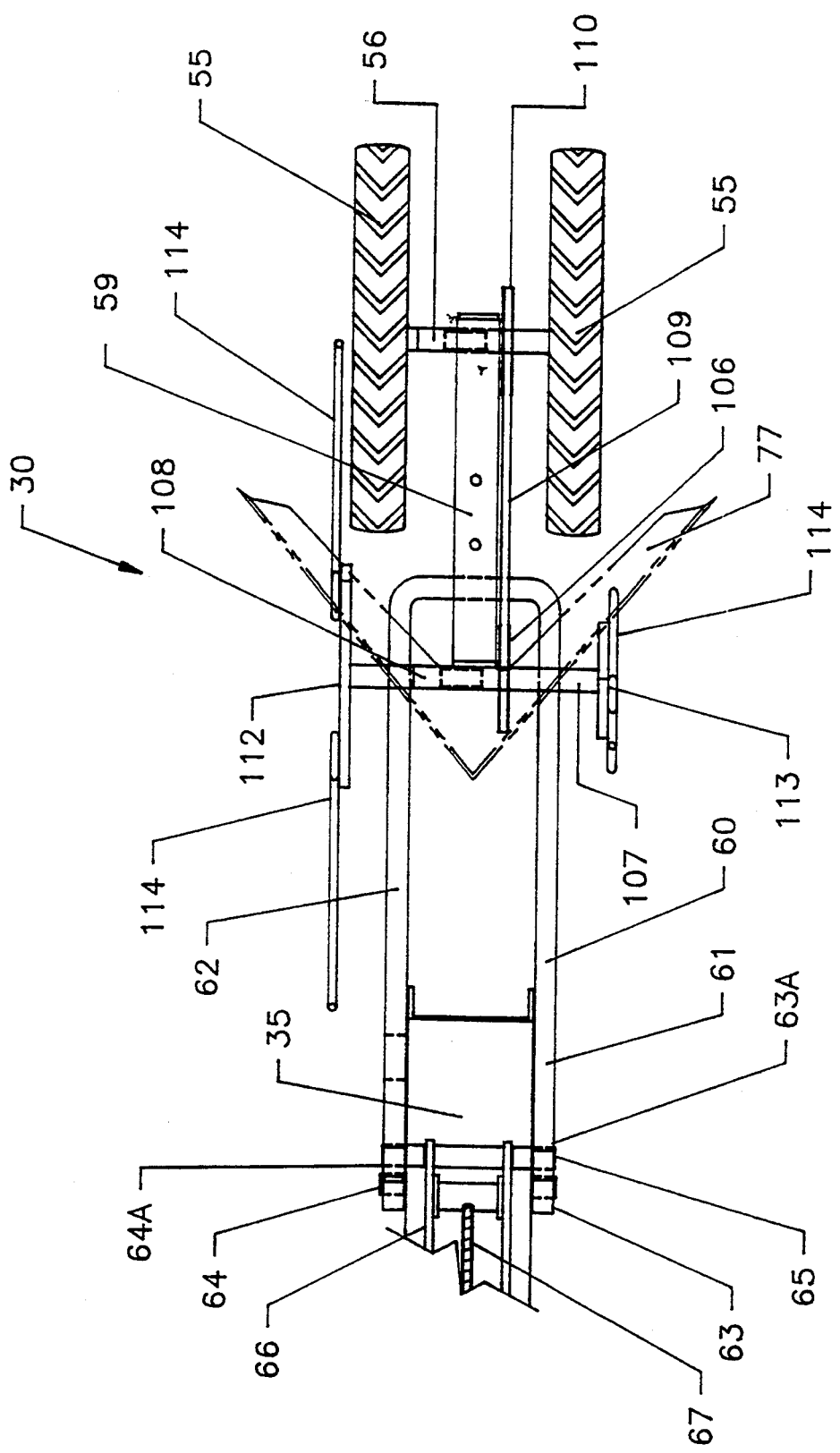
FIG. 2 is a plan view of a part of the seeding element of FIG. 1 and taken along the lines 2—2 in FIG. 1.
Figure 3:
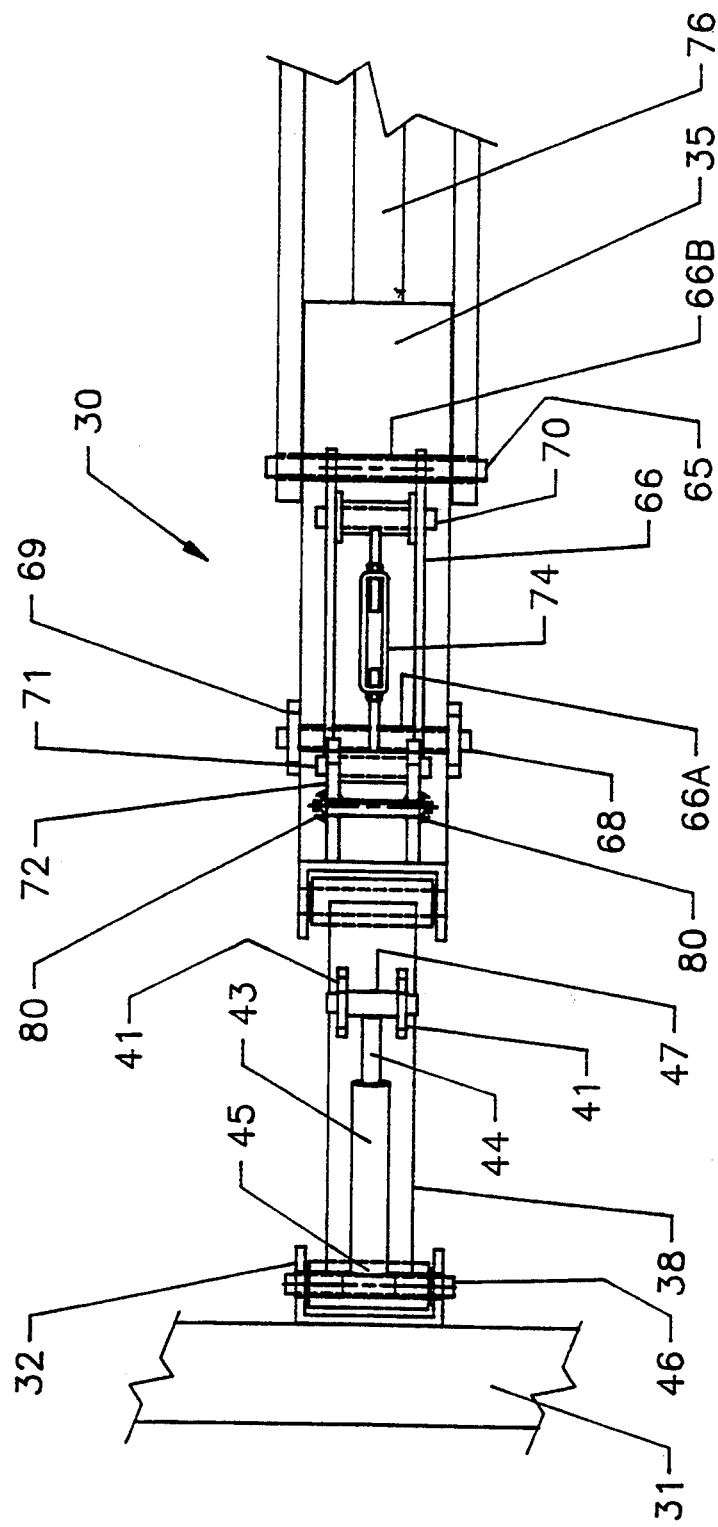
FIG. 3 is a plan view of one part of the seeding element of FIG. 1 and taken along the lines 3—3 of FIG. 1.

As best shown in FIG. 6, the seed supply duct 87 divides into two separate duct portions 101, 102. A suitable splitting edge 103 is designed to separate the seeds flowing through the duct 87 in the air stream generated by the fan into two substantially equal streams of the seeds for separate seeding within the interior of the sweep. Each tube 101, 102 extends into the sweep at a position forwardly of trailing edges 104 thereof and within the triangular area defined by the inside edges of the horizontal portions 97, 98. The tubes 101, 102 diverge outwardly to open discharge ends 121, 122 a position underlying the body of the sweep that is within the area bounded by the walls 95 and 96 and the horizontal wall 97, 98. In operation, therefore, the seeds are discharged from the open ends of the tubes which extend into the cavity formed by the sweep within the soil and are then covered as the soil falls onto the seeds rearwardly of the sweep. The seeds are thus supplied in two separate rows with little dispersion of the seeds out of the two separate rows.

In the case where the flap valve of FIGS. 8 and 9 is opened to bleed fertilizer into the seed tubes, this fertilizer is then applied to the ground with the seeds to assist in growth immediately after germination.

The knife 88 as best shown in FIG. 1 extends from a position at the bottom of the shank just behind the central flange 99 of the sweep rearwardly and downwardly to a height just below that of the bottom cutting plane of the sweep. The length of the knife is such that its lower end is generally within the confines of the sweep, that is forwardly of the trailing edges 104.

The depth of the sweep within the ground is accurately controlled by the height of the main support frame 33 relative to the ground which is itself controlled by the walking beam rolling over the surface of the ground. Each individual seeding element is therefore controlled individually since it has its own walking beam arrangement which therefore operates on the actual portion of the soil over which the seeding element is running. The walking beam action including the front rolling element 53 and the rear rolling elements 55 ensures an accurate control since the front rolling element is responsive to undisturbed soil. The front rolling element also acts to lift up the sweep in preparation for an increased depth and in preparation for any obstacles which may be encountered. However the trip action of the sweep ensures that the sweep is protected should it encounter an obstacle when lifted insufficiently by the front rolling element 53.

The seeding action in two separate rows under a single sweep enables seeding to be effected with one-half of the number of seeding elements that would be necessary in the conventional seeding using single rows. The double packer wheel arrangement trailing the seeding action ensures that each row of seeds is properly packed. The common height control of the seeding action and the fertilizer banding ensures that the depth of the fertilizer is controlled properly with regard to the depth of the seed.

The pressure applied by the cylinder 43 under proper control of the hydraulic pressure control system ensures a constant pressure downwardly onto the packing wheels and the seeding system regardless of any changes in height or movement of the frame. This allows the hopper to be carried by the frame since the weight of the hopper which changes as the hopper empties does not in any way affect the pressure applied to the seeding element onto the ground.

It is intended that the present seeding system is used in a low till or no till farming operation so that generally the seeding action will take place in the presence of considerable quantities of trash that is remaining crop residue from previous seasons. Such crop residue can be within the soil, extending outwardly from the soil or simply loosely spread over the soil. In any event it is well known in such seeding action that the residue material can build up in front of the shank 76 in the curved area just above the sweep. Should this occur, the build up rapidly leads to a plugging action which prevents proper and continued operation of the seeding system. The present device therefore includes an arrangement indicated at 105 for clearing any trash or crop residue material collecting in the area in front of the shank 76. The trash clearing system comprises a drive pulley 106 mounted on a shaft 107 for rotation about the longitudinal axis of the shaft which is transverse to the direction of movement. The shaft 107 is mounted within a sleeve 108 connected across the top of the side struts 61 and 62 and at a forward end of the strut 59. The shaft 107 projects outwardly from each end of the sleeve 108 that is beyond the sides of the side strut 61 and 62. The pulley 106 is driven by a belt 109 from a drive pulley 110 mounted on the shaft 56 of the rear wheels 55. The pulley 110 is thus rotated by the shaft 56 which causes the belt 109 to drive the pulley 106 about the axis of the shaft 107 thus rotating the shaft. At each end of the shaft 107 is mounted a support plate 112 and 113 each of which is rectangular and projects outwardly from the shaft 107 in a plane at right angles to the shaft. Each plate carries a pair of tines 114 which projects substantially radially outwardly from the shaft 107 in the same plane as the supporting end plate. The tines are attached by a conventional clamping action to the plate. As the shaft is thus rotated, the tines sweep around the axis of the shaft and thus, as will be apparent from a study of FIGS. 1 and 2 this will cause the tines to move to the position parallel to but spaced to the side of the shank 76. As shown in FIG. 2 the tines just sweep past the outside edges of the wheels 55. It has been found surprisingly that this action is sufficient to knock or contact any material collecting in the hollow of the shank and will cause this material to move to one side of the shank and break away rather than to continue to plug. The tines on one side of the seeding element are offset at 90° relative to those on the other side so that the material is impacted sequentially from one side and then from the second side.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural seeder comprising a frame, ground wheel means for supporting the frame for transportation in a direction of working movement across ground to be seeded, a plurality of seeding elements mounted on the frame at spaced positions across the width of the frame for applying seeds to the ground as the frame is moved across the ground, supply means for supplying seeds to each seeding element, each seeding element including ground cutting means for cutting a furrow into the surface of the ground, seed feeding means for depositing seeds from the supply means onto the ground within the furrow, mounting means mounting the ground cutting means of each seeding element for up and down floating movement relative to the frame independently of the other seeding elements to vary the height of the cutting means relative to the frame, and height control means for controlling the height of the cutting means relative to the ground such that the cutting means moves relative to the frame to be maintained at a required height relative to the ground surface, said height control means comprising a first grounding engaging rolling element positioned forwardly of the cutting means, a second ground engaging rolling element positioned rearwardly of the cutting means, interconnecting strut means rigidly interconnecting the first and second rolling elements and pivot mounting means connecting the strut means to the mounting means to allow free pivotal movement of the strut means and the first and second rolling elements relative to the mounting means about an axis transverse to the direction of movement such that vertical movement of either of the first and second rolling elements is communicated to the cutting means.

2. The seeder according to claim 1 wherein the mounting means includes a main frame element and wherein the cutting means is connected to the main frame element and extends downwardly therefrom and wherein the interconnecting strut means includes a first strut extending from the main frame element forwardly and downwardly to the first rolling element and a second strut extending rearwardly and downwardly from the main frame element to the second rolling element, the first and second struts being interconnected rigidly, the pivot mounting means connecting the first and second struts to the main frame element.

3. The seeder according to claim 2 including means for adjusting the height of the pivot mounting means and the struts relative to the mainframe element.

4. The seeder according to claim 1 wherein the second rolling element comprises a packer wheel having a peripheral surface rolling on the ground for causing packing of soil in the furrow and wherein the first rolling element includes a peripheral surface shaped to roll over the ground surface without cutting thereof.

5. The seeder according to claim 4 wherein the first and second rolling elements are substantially identical.

6. The seeder according to claim 1 including parallelogram linkage means between the main frame element and the frame allowing substantially vertical movement of the main frame element relative to the frame.

7. The seeder according to claim 6 including a hydraulic cylinder connected between the frame and the main frame element along side the parallelogram linkage and arranged at an angle to the parallelogram linkage as to apply downward pressure to the main frame element.

8. The seeder according to claim 1 wherein the mounting means includes a main frame element, the interconnecting strut means being mounted on said main frame element by said pivot mounting means allowing pivotal movement of the interconnecting strut means and the first and second rolling elements relative to the main frame element, and wherein the cutting means in mounted on a shank carried by the main frame element and extending downwardly therefrom.

9. The seeder according to claim 8 including spring trip means between the shank and the mainframe element to allow tripping of the shank and the cutting means relative to the main frame element in response to impact with an obstacle.

10. The seeder according to claim 9 wherein the main frame element comprises a substantially horizontal channel member having an open face thereof facing downwardly and wherein the shank includes a portion thereof extending substantially horizontally within said channel member and pivotally mounted thereon.

11. An agricultural seeder comprising a frame, means for supporting the frame for transportation in a direction of working movement across ground to be seeded, a plurality of seeding elements mounted on the frame at spaced positions across the width of the frame for applying seeds to the ground as the frame is moved across the ground, supply means for supplying seeds to each seeding element, each seeding element including ground cutting means for cutting a furrow into the surface of the ground, seed feeding means for depositing seeds from the supply means onto the ground within the furrow, means mounting the cutting means on the frame including a shank extending upwardly from the cutting means and lying in a substantially vertical plane parallel to the direction of working movement, and trash cleaning means for removing crop residue material from becoming trapped on a front surface of the shank and carried thereby, the trash cleaning means comprising a cross shaft extending transversely of the shank at a position spaced rearwardly relative to a direction of travel from the shank and including for each shank a first and a second tine mounted on the cross shaft for rotation about a longitudinal axis of the cross shaft, and means for driving the shaft such that the tines rotate to a position where a portion thereof lies along side the shank to knock said crop residue material, the first of the tines being arranged on one side of the shank and the second of the tines being arranged on an opposed side of the shank, the first and second tines being angularly offset relative to the axis of the cross shaft so as to knock the crop residue at different times.

12. The seeder according to claim 11 wherein said driving means is arranged to drive movement of the trash cleaning member in response to movement of the seeding element across the ground.

13. The seeder according to claim 11 wherein the seeding element includes a packer wheel for rolling across the ground rearwardly of the cutting means and wherein the cross shaft is driven from the rotation of the packer wheel.

14. An agricultural seeder comprising a frame, means for supporting the frame for transportation in a direction of working movement across ground to be seeded, a plurality of seeding elements mounted on the frame at spaced positions across the width of the frame for applying seeds to the ground as the frame is moved across the ground, supply means for supplying seeds to each seeding element, each seeding element including ground cutting means for cutting a furrow into the surface of the ground, seed feeding means for depositing seeds from the supply means onto the ground within the furrow, the cutting means comprising a sweep shaped to define two cutting edges lying in a common horizontal first plane and diverging outwardly and rearwardly from a forwardmost apex lying on a center line of the sweep to two trailing apexes, two inclined sweep surfaces each inclined upwardly and rearwardly from a respective one of the cutting edges and two further sweep surfaces each extending rearwardly in a substantially horizontal second plane from an upper edge of a respective one of the inclined sweep surfaces to a trailing edge, with the trailing edges diverging outwardly and rearwardly of a point of intersection of the trailing edges, thus defining a cavity above the first plane and below the second plane, rearwardly of the apex and outwardly of the trailing edges, said seed feeding means including a feeding tube and means splitting the feeding tube into a first and second delivery tube each extending to an outlet end located within the cavity on a respective side of the center line rearwardly and outwardly of the apex, forwardly of the trailing apexes and outwardly of the trailing edges.

15. The seeder according to claim 14 including a knife member extending rearwardly and downwardly relative to the sweep to a position rearwardly of the sweep and lying substantially on a center line of the sweep and feeding means for feeding fertilizer through a tube exiting immediately rearwardly of the knife.

16. The seeder according to claim 14 wherein the sweep is mounted upon a shank, the shank being pivotal about a pin transverse to the direction of working movement and wherein there is provided means for adjusting the angle of the shank about the transverse pin so as to adjust the angle of the sweep to position the cutting edges in the common horizontal first plane.

17. An agricultural seeder comprising a frame, means for supporting the frame for transportation in a direction of working movement across ground to be seeded, a plurality of seeding elements mounted on the frame at spaced positions across the width of the frame for applying seeds to the ground as the frame is moved across the ground, first supply means for supplying seeds to each seeding element, second supply means for supplying fertilizer to each seeding element, each seeding element including ground cutting means for cutting a furrow into the surface of the ground, seed feeding means for depositing seeds from the first supply means into the ground within the furrow, fertilizer feeding means for depositing fertilizer from the second supply means into the ground within the furrow, the first supply means comprising a first hopper and a first supply duct into which seeds are metered from the hopper, the second supply means comprising a second hopper and a second supply duct into which the fertilizer is metered from the second hopper, air flow means for injecting air flow along the first and second supply duct to transport the seeds and fertilizer respectively from the first and second hoppers to the seed feeding means and the fertilizer feeding means respectively, the first and second supply ducts being arranged with at least a portion thereof side by side to define a common wall therebetween, and valve means for bleeding from the second supply duct into the first supply duct a small portion of the fertilizer flowing therein, the valve means comprising an opening through the common wall and a flap valve mounted at the opening on the common wall for pivotal movement about an axis lying in the common wall at right angles to the length of the side-by-side portions of the supply ducts so that the flap valve is movable from a first position substantially closing the opening to adjustable positions on at least that side of the common wall which lies in the second supply duct to divert an adjustable portion of the fertilizer from that side of the common wall through the opening into the first supply duct.

* * * * *